3,072,697
PROCESS FOR PRODUCING ORGANOLEAD COMPOUNDS
Herbert Jenkner, Hannover-Wulfel, Germany, assignor to Kali-Chemi A.G., Hannover, Germany
No Drawing. Original application May 12, 1955, Ser. No. 507,993. Divided and this application May 21, 1962, Ser. No. 196,465
Claims priority, application Germany May 19, 1954
2 Claims. (Cl. 260—437)

This invention is a division of my co-pending application Ser. No. 507,993, filed May 12, 1955 and relates to a process of producing organic compounds of the elements of the groups II to V of the periodic table and is more particularly concerned with a process of introducing organic radicals into fluorides of certain elements by means of an organic aluminum compound.

The introduction of organic radicals into inorganic metallic compounds has been attempted in various ways and several processes have been proposed. These processes, however, have suffered from one or more drawbacks, such as difficultly-obtainable reagents, poor yields, handling problems, and the like, which have limited their industrial utility.

It is the object of the present invention to provide a process for introducing organic radicals, particularly hydrocarbon radicals, into inorganic metallic compounds which avoids the drawbacks and disadvantages of processes heretofore proposed.

In accordance with the invention, compounds of the formula $MR_x$ are formed wherein M is an element of groups II to V, inclusive, of the periodic table, R is a hydrocarbon radical, and $x$ is an integer corresponding to the valence of the element M, by reacting a fluoride or complex fluoride of the element M with an organic aluminum compound containing the radical R. In accordance with the invention, M is preferably an element of groups IIB, IIIA, IVA or VA of the periodic table as set forth, for example at page 312 of the thirtieth edition of the "Handbook of Chemistry and Physics." Particularly suitable are fluorides and complex fluorides (particularly complex fluorides containing an alkali metal in the molecule) of antimony, arsenic, boron, cadmium, lead, mercury, phosphorus, tin and zinc. Examples of such fluorides and complex fluorides of M employable in accordance with the invention are, $BF_3$, $AsF_3$, $SbF_3$, $SnF_2$, $ZnF_2$, $PbF_2$, $CdF_2$, $KBF_4$ and $KAsF_4$.

The organic aluminum compounds which are reacted with the fluorides and complex fluorides of the element M are aluminum compounds containing the radical R wherein R is an alkyl radical, an aryl radical, or an aralkyl radical or ether coordination compounds of such aluminum compounds, e.g. diethyl ether and dimethyl ether coordination compounds. When R is an alkyl radical it preferably contains 1 to 12 carbon atoms, such as methyl, ethyl, propyl, butyl and the like. When R is an aryl radical, it preferably contains 6 to 12 carbon atoms, such as phenyl, tolyl, xylyl and the like, and when R is an aralkyl radical it is preferably a benzyl radical or a benzhydryl radical or hydrocarbon-substituted derivative thereof.

The reaction between the organic aluminum compound and the fluorides or complex fluorides of M proceeds smoothly and the product $MR_x$ is produced in high yields. This is due to the fact that in this reaction the substances obtained as by-products such as, for example, $AlF_3$, $AlFR_2$ and $AlF_2R$, do not cause secondary or reversible reactions. The primary reaction product $(MR_x)$ formed in all of these reactions can be readily separated from the reaction mass by simple distillation, extraction, or centrifuging. Generally speaking, the reaction temperature employed is between 10 and 250° C., preferably 80 to 180° C., and the reaction may be carried out at atmospheric pressure or under superatmospheric pressure, in any suitable pressure vessel. The reaction may be carried out in the absence of solvents or in the presence of inert solvents such as benzene, toluene, hexane, and like inert hydrocarbons.

The reaction takes place, for example, according to the following equations:

(1) $AsF_3 + AlR_3 \rightarrow AsR_3 + AlF_3$
(2) $KBF_4 + AlR_3 \rightarrow BR_3 + AlF_3 + KF$
(3) $ZnF_2 + 2Al(C_2H_5)_3 \rightarrow Zn(C_2H_5)_2 + 2Al(C_2H_5)_2F$
(4) $AsF_3 + AlR_3 \cdot (C_2H_5)_2O \rightarrow AsR_3 + AlF_3 + (C_2H_5)_2O$
(5) $KBF_4 + AlR_3 \cdot (C_2H_5)_2O \rightarrow$ 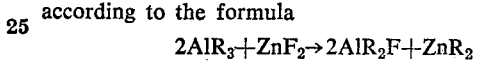
$BR_3 + AlF_3 + (C_2H_5)_2O + KF$ R designates alkyl, aryl or aralkyl in the above formulae.

The following specific examples are further illustrative of the invention, all parts being by weight:

*Example 1*

228 parts of aluminum triethyl are heated to about 90 to 130° C. and gradually mixed, while stirring, with a total of 103 parts of $ZnF_2$. Zinc diethyl is formed according to the formula $$2AlR_3 + ZnF_2 \rightarrow 2AlR_2F + ZnR_2$$

and distills off at 112° C. with a yield of over 75%. Subsequently the aluminum diethyl fluoride which is formed as a by-product of the above reaction is distilled off in vacuo. It is a colorless liquid which has only a slight tendency to flow at room temperature.

*Example 2*

114 parts of aluminum triethyl are dissolved in 300 parts of anhydrous hexane and brought to reaction by adding in drops, while stirring, 132 parts of arsenic-trifluoride. The reaction is very vigorous even at room temperature (about 20° C.). The arsenic triethyl which is formed is distilled off at about 140 to 142° C. after the hexane has been removed by distillation. The yield of arsenic triethyl is more than 80% of the theoretical.

*Example 3*

114 parts of aluminum triethyl are gradually mixed at room temperature with a total of 75 parts of cadmium fluoride. Cadmium diethyl is formed according to the formula $$2AlR_3 + CdF_2 \rightarrow 2AlR_2F + CdR_2$$

The cadmium diethyl thus formed (B.P. 10 mm. 42–45° C.) as well as the diethyl aluminum fluoride which is formed as by-product are separated by distillation. The yield of cadmium diethyl is more than 75%.

*Example 4*

188 parts of aluminum-diethyl diethyl-etherate are added in drops to 186 parts of potassium fluoborate, which has been previously heated in an oil bath to 180° C. The reaction, which starts immediately, is at first very vigorous but then becomes gradually slower as the addition of the aluminum-diethyl diethyl-etherate progresses. The boron triethyl which is formed is separated from the reaction mixture by distillation and is recovered in a yield of 80%.

*Example 5*

206 parts of aluminum-triethyl diethyl-etherate, diluted with equal parts of ether, are added in drops, while stirring and cooling, to 132 parts of arsenic fluoride. The reaction is instantaneous. After separation of the ether, 85% of the theoretical yield of arsenic triethyl (B.P. 138–141° C.) is recovered from the reaction vessel.

Example 6

21.5 parts of antimony trifluoride are suspended in 55 parts of ether, and 18.8 parts of aluminum-triethyl diethyl-etherate are added in drops while stirring. The reaction proceeds smoothly and antimony triethyl is formed. This product (B.P. 56° C./10 mm.) is distilled off by vacuum distillation after the ether has been removed by simple distillation. The yield is 60% of the theoretical.

Example 7

114 parts by weight of $Al(C_2H_5)_3$ are added in drops while stirring to 129 parts by weight of $KBF_4$ which is heated in a glass flask to 160–170° C. Boron triethyl forms immediately and is distilled off as the aluminum triethyl is added. After the total amount of aluminum triethyl had been added, about 60% of the theoretical yield of boron triethyl is formed. Finally, the mixture remaining in the reaction flask is heated to 220–250° C. and after the reaction has finished, a total of 89 parts of boron-triethyl are obtained, which corresponds to a yield of 91% of the theoretical.

Example 8

179 parts of freshly sublimated antimony trifluoride are added gradually, with stirring, at 120–135° C. during the course of 1½ hours to 342 parts of aluminum triethyl contained in a three-necked flask under nitrogen. The reaction starts immediately after each addition of antimony trifluoride. After the total quantity of antimony trifluoride has been added, the mixture is heated briefly to 140° C. to complete the reaction. The antimony triethyl formed is distilled off in vacuo in 90% yield relating to the formula $$SbF_3 + 3AlR_3 \rightarrow SbR_3 + 3AlR_2F$$

Example 9

Lead tetraethyl can be obtained from lead fluoride and aluminum-triethyl in a manner similar to that described in Example 5. The lead diethyl formed in the first stage of the reaction decomposes immediately, forming lead tetraethyl and lead according to the formula $$2Pb(C_2H_5)_2 \rightarrow Pb + Pb(C_2H_5)_4$$

The lead tetraethyl can be distilled off from the residue or can be extracted from it by known solvents for this compound.

Example 10

A pressure vessel is charged with equimolar amounts of aluminum triethyl and boron fluoride. The reaction starts immediately, with the temperature rising up to about 100° C. To complete the reaction heating is continued briefly at about 200° C. The yields are almost quantitative, both with regard to aluminum triethyl and boron fluoride. Boron triethyl can also be produced by simply introducing boron fluoride into aluminum triethyl, but the yields of boron triethyl are much higher when working under pressure, e.g. a pressure of 5 to 50 atmospheres.

Instead of $AlR_3$ it is possible to use as in the most examples previously stated $AlR_2F$ (e.g. issued as by-product according to the Examples 1, 3 and 8) as means for alkylation. The end product of the process of this aluminum-organic compound is then $AlF_3$ with very small quantities of impurities with $AlRF_2$.

I claim:

1. A process of producing a hydrocarbon lead compound which comprises reacting a lead fluoride with a hydrocarbon aluminum compound wherein the hydrocarbon portion of said compound is selected from the group consisting of alkyl and aryl radicals.

2. The process as claimed in claim 1 wherein said hydrocarbon aluminum compound is triethyl aluminum.

References Cited in the file of this patent

UNITED STATES PATENTS 2,985,675     Blitzer et al.  ---------- May 23, 1961

UNITED STATES PATENT OFFICE
CERTIFICATE OF CORRECTION

Patent No. 3,072,697 January 8, 1963

Herbert Jenkner

It is hereby certified that error appears in the above numbered patent requiring correction and that the said Letters Patent should read as corrected below.

In the grant, lines 2 and 11, and in the heading to the printed specification, line 5, for "Kali-Chemi A.G.", each occurrence, read -- Kali-Chemie A.G. --.

Signed and sealed this 9th day of July 1963.

(SEAL)
Attest:

ERNEST W. SWIDER
Attesting Officer

DAVID L. LADD
Commissioner of Patents